United States Patent
White

(10) Patent No.: US 6,663,149 B1
(45) Date of Patent: Dec. 16, 2003

(54) THREADED CLOSURE

(75) Inventor: Billy W. White, Spring, TX (US)

(73) Assignee: Robins & Myers Energy Systems, L.P., Houston, TX (US)

( * ) Notice: Subject to any disclaimer, the term of this patent is extended or adjusted under 35 U.S.C. 154(b) by 403 days.

(21) Appl. No.: 09/778,292

(22) Filed: Feb. 6, 2001

(51) Int. Cl.[7] ............................................. E05B 65/00
(52) U.S. Cl. ............................ 292/256.5; 292/256.73; 81/3.15; 138/89; 220/327
(58) Field of Search ...................... 292/256.5, 256.6, 292/256.65, 256.67, 256.73; 138/89, 96 R; 285/92; 220/327; 81/3.37, 3.07, 3.09, 3.2, 3.25, 3.31, 3.33, 3.36, 3.15

(56) References Cited

U.S. PATENT DOCUMENTS

| | | | | |
|---|---|---|---|---|
| 2,982,437 A | * | 5/1961 | Wheatley | 220/46 |
| 3,195,761 A | * | 7/1965 | Coats | 220/36 |
| 3,672,403 A | * | 6/1972 | Wilson | 138/89 |
| 3,817,564 A | * | 6/1974 | Baldwin | 292/256.67 |
| 3,907,349 A | * | 9/1975 | Kane | 292/256.67 |
| 3,989,290 A | * | 11/1976 | Aubert et al. | 292/256.65 |
| 4,036,385 A | * | 7/1977 | Morris | 215/209 |
| 4,075,796 A | * | 2/1978 | Cuozzo | 52/20 |
| 4,237,936 A | * | 12/1980 | Lollis | 138/90 |
| 4,288,001 A | * | 9/1981 | Lankston | 220/316 |
| 4,349,048 A | * | 9/1982 | Clark | 138/96 T |
| 4,848,458 A | * | 7/1989 | Holdsworth | 166/92 |
| 5,033,501 A | * | 7/1991 | Stehling | 137/296 |
| 5,111,955 A | * | 5/1992 | Baker | 220/303 |
| 5,560,510 A | * | 10/1996 | Grebenyuk et al. | 220/284 |

* cited by examiner

Primary Examiner—Gary Estremsky
(74) Attorney, Agent, or Firm—Browning Bushman

(57) ABSTRACT

Methods and systems are provided for a vessel or pipeline closure such as the type used on pipeline pig launching and receiving systems, and closures on access portals for pressurized vessels. A threaded closure 10 is disclosed which may eliminate hammering on hammer-lugs to tighten or loosen the closure from the vessel, thereby improving safety, closure life expectancy and functional operation. A closure 10 according to the present invention may include a hub 12 fixedly and sealingly secured to the vessel, and a cap 30 for threaded engagement with the hub 12. An anchor 22 may be fixedly secured to the hub and a tightening pulling ear 32 and a loosening pulling ear 132 each may be fixedly secured to the cap 30. An actuatable pulling assembly 20 may be engaged with the anchor 22 and selectively with one of the pulling ears 32 or 132, and actuated, such as by selectively turning a threaded nut 28 on a threaded bar 26, or by pressurizing a fluid-cylinder 126, 127, to thereby selectively tighten the cap to the hub or loosen the cap from the hub.

18 Claims, 2 Drawing Sheets

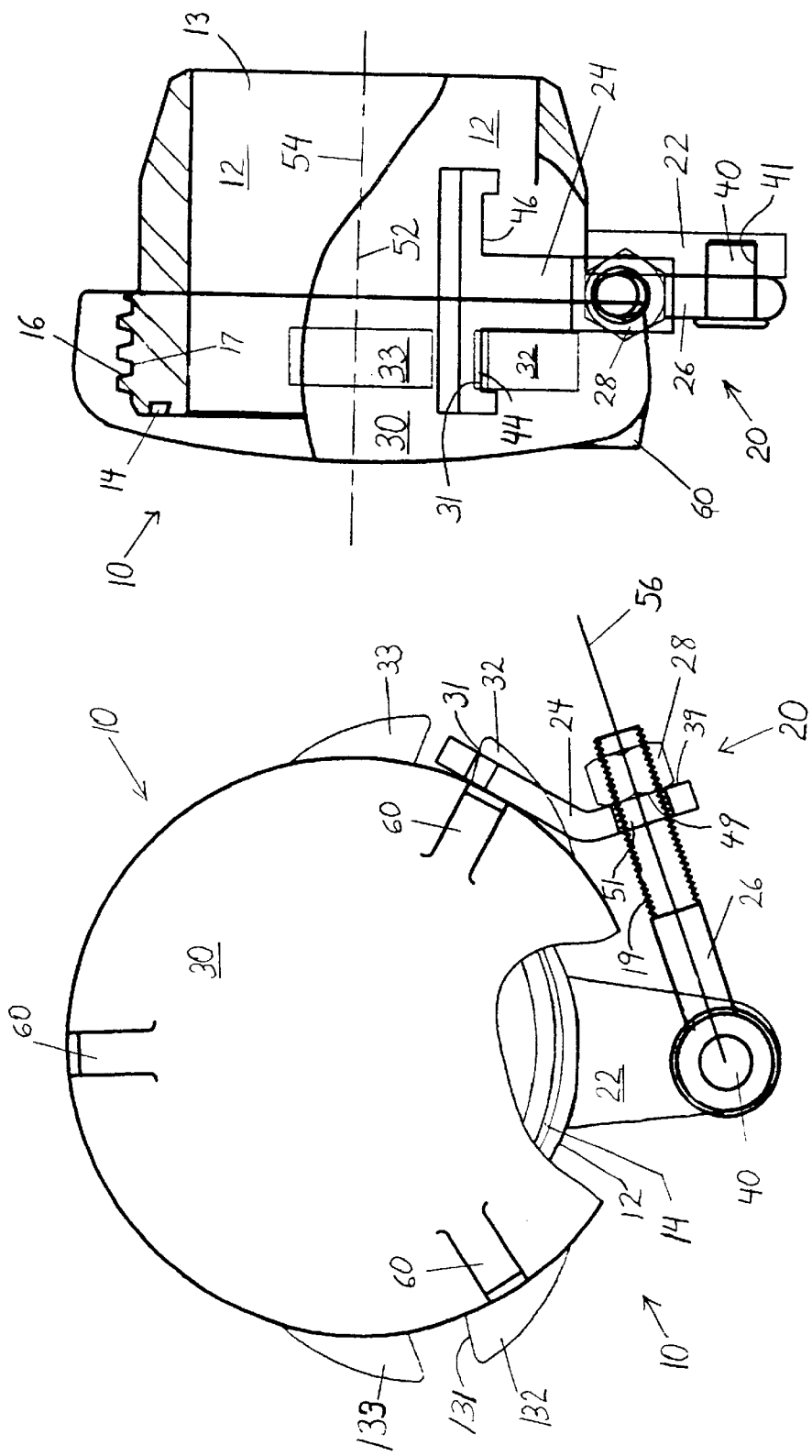

THREADED CLOSURE

FIELD OF THE INVENTION

The present invention relates to vessel or pipeline closures, which selectively enclose and seal an interior portion of a pressure containing vessel or pipeline. More particularly, the methods and systems of this invention relate to closures such as the type used on pipeline pig launching and receiving systems, and closures on access portals for pressurized vessels. The methods and system of this invention may improve safety, closure life expectancy and functional operation.

BACKGROUND OF THE INVENTION

One function of a closure is to allow relatively convenient and potentially routine access to the interior of a pressure-containing vessel or volume. Pipelines are commonly cleaned and/or inspected by launching pipeline "pigs" into a portion of the pipeline system and then recovering the pig and accumulated debris at a receiving point. An end portion of the pig launchers and receivers are commonly capped with a closure. A pipeline closure is essentially a selectively operable door to the pipeline that securely contains pressure within the pipeline when the closure is closed and sealed.

Closures also may be included on volumetric pressurized vessels to provide access to an interior portion of the vessel. The vessel typically carries a high pressure therein, such as from less than one-hundred psig to in excess of 1000 psig. Closures may be found in a range of nominal sizes corresponding with pipeline sizes and vessel access port sizes. Common sizes range from 2 to 14 inches, but smaller and larger closures are also known. These closures are commonly manufactured substantially from metallic materials in a closed die forging process.

Closures are composed of basically two components, a hub and a cap. The hub may be secured to the vessel or pipeline, typically by welding or threading. The hub may include a threaded portion including an external/male thread, such as a relatively heavy-duty ACME thread to mate with the cap. The cap may cover the access port to the vessel, and may removably secure to the hub. The cap may include an internal/female thread for threadably mating the cap with the hub.

An O-ring or other sealing member may be included to seal against leakage of pressurized vessel/pipeline contents between the cap and the hub. Heavier closures may also include a hinge and/or support members, such as a pivoting swing-arm to assist with manipulation of the cap when disconnected from the hub.

Prior art closures are commonly constructed with "hammer lugs" or "wings" on an external portion of the cap to allow the cap to be tightened to and loosened from the hub via hammer blows on the lugs. In some instances, such practice may be performed with relatively heavy hammers.

Although the cap is commonly made from relatively ductile steel, the hammer blows may leave marks on the cap and result in deformation of the lugs. With continued use, the lugs may substantially deform and the metal material on the lug may begin to fold back or "cauliflower". Such hammering cold works and embriffles the material of the "hammer lug". The hammer blows may result in ejection of small pieces of metal from the lug or cap traveling at extremely high velocities. Such material may pose a severe safety hazard with lug-type closures. These projectiles of varying size may result in injury to eyes and skin penetration of persons near the struck lug. Routine maintenance may be required to file down sharp edges and remove deformed lug material to reduce the likelihood of such occurrence.

An additional safety hazard with lug type enclosures includes the generation of sparks when struck by metal hammers. Under certain conditions, such as when the vessel/pipeline contains flammable material, or in a classified environment, such as in an enclosed building or a confined area, it may desirable, if not required, to avoid the generation of any sparks. In such instances, the use of a lug type closure may require the use of special hammers, such as brass or rubber.

An additional problem with metallic lug-type closures may result from hammer impacts. The cap material, particularly in and near impacted areas, may develop stress cracks. Such cracks in the work hardened material may reduce the safety, reliability and working strength of the cap. Particularly in the presence of corrosive gasses or liquids, corrosion cells or sites may initiate within microscopic cracks. In cold climates, the cap material may also become more brittle and even more susceptible to generation of flying particles and creation of stress-fractures.

The disadvantages of prior art are overcome by the present invention. An improved closure and closure method eliminating the need to tighten and/or loosen the closure via hammer blows are described herein.

SUMMARY OF THE INVENTION

This invention provides methods and systems for constructing a vessel or pipeline closure, which is relatively simple to operate, reliable and cost effective. The closure of this invention may eliminate hammering on the lugs to tighten or loosen the closure. This closure may be tightened and/or loosened by applying a substantially linear force tangentially to a radially outward portion of the cap.

In one embodiment, a nut and bolt system may be provided which may be utilized to selectively apply the tightening force and/or the loosening force, utilizing the same nut and bolt system.

It is an object of this invention to provide a closure that improves closure safety. The optionally lugless closure of this invention may eliminate lug-hammering and the detrimental effects associated therewith.

It is an object of this invention to provide a closure that improves closure operation. The tightening and loosening methods and systems of this invention provide a safe, reliable and effective closure operation.

It is a feature of this invention that the opening and closing apparatus may improve closure safety by preventing the closure from prematurely loosening during closed service.

It is a feature of this invention to provide a closure system, which is relatively simple to operate and may not require any special tools or skills for its operation.

It is also a feature of this invention that the closure may be utilized in hazardous environments, classified areas, or other locations where the generation of sparks and/or flying metal particles may lead to detrimental ignition or other bodily injury.

It is a further feature of this invention that existing closures may be altered or retro-fitted to incorporate this invention.

An additional feature of this invention is that when the cap is tightened to the hub, the pulling assembly used for tightening the cap may remain secured in place, engaged with the tightening pulling ear to maintain the cap securely tightened with the hub. Thereby, inadvertent loosening, such as by impact or thermal changes, may be precluded.

It is an advantage of this invention that, due to the possible elimination of hammering, the closure cap may not be subjected to hammering forces which might otherwise create stress cracks or work-hardening.

It is also an advantage of this invention that the closure cap may still be externally supported by hinges or supports, when the cap is opened.

It is a further advantage of this invention that maintenance such as may be required to maintain hammer lugs in a safe condition may be reduced or eliminated.

It is yet another advantage that a closure according to this invention may also be fabricated and/or purchased at a cost not substantially different from prior art closures.

These and further objects, features, and advantages of the present invention will become apparent from the following detailed description, wherein reference is made to figures in the accompanying drawings.

BRIEF DESCRIPTION OF THE DRAWINGS

FIG. 1 is an elevational, top-view illustration of a closure according to the present invention, including a bolt and nut pulling assembly.

FIG. 2 is an elevational side-view illustration in partial cross-section of the closure illustrated in FIG. 1.

DETAILED DESCRIPTION OF PREFERRED EMBODIMENTS

Figure 3:
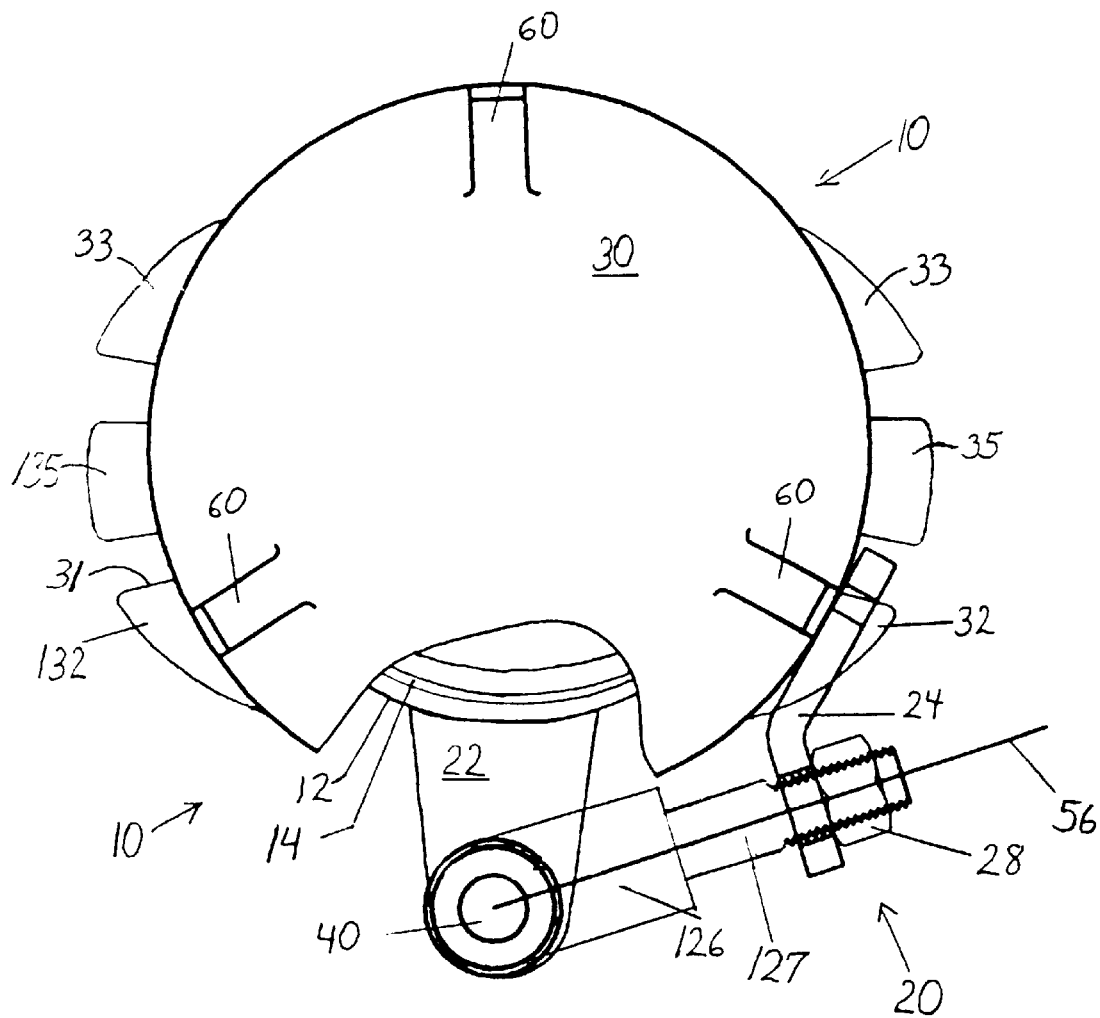
FIG. 3 is an elevational, top view illustration of a closure according to present invention, including a bolt and nut pulling assembly and illustrating a fluid-actuated cylinder pulling bar component, and multiple tightening and loosening pulling ears.

FIG. 1 illustrates components that may be included with a closure 10 according to the present invention. A closure may be used for sealing closed an opening or port in a vessel. The term vessel as used herein may be defined broadly to encompass closures for pipelines, tanks, containers, or other volumetric enclosures in which a pressure internal to the vessel may be different from a pressure external to the vessel. Such volumetric enclosures may include containment vessels in which a product media is conducted, retained and/or processed. A closure may be manufactured substantially from metallic components.

In one embodiment, a tightening or loosening force may be applied to the closure cap 30 through a pulling assembly 20 including components that interact to apply a pulling force substantially tangential to a surface of a closure cap 30, so as to cause the cap 30 to rotate relative to the vessel. The port in the vessel may include a port axis 52, which may define a central axis through the port.

A closure hub 12 may be provided to engage the closure cap 30 to secure the cap over the port. A vessel end of the hub 12 may be fixedly, sealingly secured to the vessel. The hub may include a through bore having a through bore axis 54, and may provide a cap end opposite the vessel end, wherein the cap end includes a cap engagement thread 16. The hub may provide a through bore 13 therein such that the hub may substantially be positioned on or aligned with the port. The hub through bore 13 may have a through bore OD at least as large as an OD of the port.

A cap 30 may include a hub engagement thread 17 for threaded engagement with the hub 30. The cap engagement thread 16 and the hub engagement thread 17 each may be an Acme thread. The threads 16, 17 may provide for one or more rotations of the cap 30 relative to the hub for sealing engagement. The threads may be configured such that the cap may be tightened beyond being substantially "hand tight" or relatively free turning, to fully sealingly engage the cap 30 with the hub 12, by a partial rotation of the cap 30, such as may be applied by a pulling system 20 according to this invention. Conversely, the cap 30 may be loosened from the hub 12 from fully sealingly engaged to being substantially handy, with a partial rotation of the cap 30, such as may be applied by the pulling system 20.

In one embodiment, as illustrated in FIGS. 1, 2, and 3, an anchor 22 may be fixedly secured to the hub 12, or any other stationary object, which may not rotate relative to the cap 30, such as a vessel body. The anchor 22 may be fixedly secured to facilitate fixedly sustaining a reaction force in response to the rotational force applied to the cap 30. The anchor 22 may provide an aperture 41, such as a port, hole or profile therein, in which to engage a component of the pulling system 20.

A first pulling ear 32 and a second pulling ear 132 each may be fixedly secured to the cap 30. The first pulling ear 32 may be for tightening the cap 30 to the hub 12 and the second pulling ear 132 may be for loosening the cap 30 from the hub 12. Each of the first pulling ear 32 and the second pulling ear 132 may have a pulling member engagement surface 31 and 131, respectively, thereon. The tightening ear 32 may be positioned at a circumferential location on a first side of the cap 30 substantially equidistant from the anchor 22 as the loosening ear 132 may be on an opposing second side of the cap 30 from the anchor 22.

A pulling bar 26 may be included, having an anchor end pivotally secured to the anchor 22 and a pulling member end selectively secured to a pulling bar end of a pulling member 24. A pivot pin 40 may be provided to pivotally engage the pulling bar with the anchor 22. The pivot pin 40 may be removably secured within or through the aperture 41 in the anchor 22. The pivot pin may facilitate pivoting the pulling bar 26 relative to the anchor, while pivotably engaged with the anchor 22, to facilitate selectively engaging the pulling member 24 with a tightening ear or a loosening ear.

The pulling member 24 may have a pulling bar end securable to the pulling member end of the pulling bar 26, and a cap end removably engagable with the first pulling ear 32 for tightening the cap to the hub and to the second pulling ear 132 for loosening the cap 30 from the hub 12. In one embodiment, the pulling member 24 may be substantially "T-shaped," wherein the base of the "T" 24 may be engaged with the pulling bar 26. An aperture 51 may be provided in the pulling member to receive the pulling bar therein. An upper portion of the T 24 may include two engagement portions for engagement with the pulling ears 32, 132. One side of the T 24 may engage the tightening ear 32, whereby a pulling surface 44 on the pulling member is substantially parallel with pulling surface 31 on the pulling ear 32, when the pulling member 24 is engaged with the pulling ear 32. Conversely, when the pulling member 24 is to be engaged with the loosening ear 132, the pulling bar 26 may be pivoted about the anchor 22, while the pulling member 24 is rotated substantially 180 degrees about the pulling bar 26, such that another side of the upper portion of the T 24 may engage the loosening pulling ear 132. A pulling member engagement surface 46 may then engage a loosening pulling ear engagement surface 131, wherein surface 46 may be substantially parallel with surface 131.

A pulling stop may be simultaneously engagable with each of the pulling member end of the pulling bar 26 and the pulling bar end of the pulling member 24 for selectively moving the pulling member 24 relative to the anchor 22 and thereby rotate the cap 30 relative to the hub 12. The lower portion of the pulling member 24 may provide a pulling stop engagement surface 39, which may be substantially parallel with an engagement surface 49 on the pulling stop 28. The pulling member may be configured with a slight bend, as illustrated in FIGS. 1 and 3. To rotate the cap 30 relative to the vessel or hub 12, an actuator in the pulling system may be actuated to effect a reduced linear distance between the pulling ear engagement surface 31 or 131, and the anchor 22.

In one embodiment, the pulling assembly 20 may be actuated by a relatively simple nut and bolt system. The pulling member end of the pulling bar may include external threads 19, and the pulling stop may include internal threads for threaded engagement of the pulling stop with the pulling bar. In essence, the pulling stop may be a threaded nut, and the pulling bar may act as a threaded bolt. Washers or bushings may be provided between the stop 28 and the pulling member 24. To rotate the cap 30 relative to the hub, the pulling stop 28 may be rotated relative to the pulling bar 24, while the pulling member 24 is engaged with the pulling ear 32 or 132, and the pulling stop 28. Thereby, the rotating pulling stop actuator 28 may cause the pulling bar 26 to move the pulling member 24 relative to the anchor 22 to rotate the cap 30 about the hub 12.

In one embodiment, protective ears 33 and/or 133 may be provided to discourage hammering on pulling ears 32 and/or 132, respectively. Such protective ears 33, 133 may be positioned relative to the tightening 32 and loosening pulling ears, respectively, to allow positioning a portion of the pulling member 24 to engage a pulling ear 32, or 132. This invention enables and discloses a closure that may be lug-less, in that rotation of the cap may not substantially depend upon intended routine hammering upon hammer-lugs for operability. In the event, however, hammering may be required, a cap may be provided one or more hammer lugs 60, to receive hammer blows for loosening or tightening the cap relative to the hub 12.

A seal member 14, such as an O-ring in an O-ring groove may be provided for sealing between the cap 30 and the hub 12 to sealingly isolate media internal to the vessel from media external to the vessel. For example, the O-ring or seal 24 may form a pneumatic seal between the cap and hub.

A method of sealingly enclosing a port in a vessel with a closure 10 may comprise fixedly securing a vessel end of a hub 12 having a through bore 13 and a through bore axis 52 to the vessel. The vessel may be such as a volumetric vessel or a pipeline for containing a pressure therein which may be different from external pressure, when the closure is closed and the vessel is in operation. A cap 30 may be threadably engaging a cap end of the hub 12, and an anchor 22 may be fixedly secured to one of the hub and the vessel.

Each of a tightening pulling ear 32 and a loosening pulling ear 132 may be fixedly secured to the cap 30. An actuatable or moveable pulling assembly, including a pulling bar 26, a pulling member 24, and a pulling stop 28, may simultaneously engage the anchor and one of the tightening pulling 32 ear and the loosening pulling ear 132. The pulling assembly 20 may be selectively actuated for selectively moving the pulling member relative 24 to the anchor 22 and thereby rotating the cap 30 relative to the hub 12 or vessel.

Threads may be provided on each of the pulling bar 26 and the pulling stop 28 for threaded engagement of the pulling stop 28 with the pulling bar 26. For example, the threaded portion of the pulling bar may function like a threaded bolt, and the pulling stop may be a nut for threadably engaging the pulling bar and the pulling member. The pulling assembly may be actuated by rotating the pulling stop 28 relative to the pulling bar 26 to rotate the cap relative to the hub. Thereby, before the pulling stop rotation runs out of threads, the cap 30 may be rotatable about the hub, either by hand or by other common non-hammering tools, such as chain tongs, strap wrench or a pipe wrench.

In an embodiment, as illustrated in FIG. 3, a pulling bar 126 may include a fluid-cylinder 126 and a piston shaft 127 or rod actuatably responsive to pneumatic or hydraulic fluid pressure. The pulling bar may include a cylinder end having a cylinder 126, which may be pivotably secured to the anchor 22, such as by pin 40. The pulling bar may also include a rod end including the piston shaft 127. The piston shaft 127 may be positioned at least partially within the cylinder 126, and may be movably responsive to fluid pressure within the cylinder 127. A pulling member end of the rod or shaft 127 may be engaged with a pulling stop 28 removably secured thereon. A pulling bar end of the pulling member 24 may be engaged with the shaft 127 and the pulling stop 28. In one embodiment, such as illustrated in FIG. 3, a portion of the pulling bar piston shaft 127 or rod may include threads thereon, and the pulling stop may be a threaded nut for threaded engagement with the shaft 127. In other embodiments, the pulling stop may be a pin or upset shoulder.

Fluid pressure may be applied within the cylinder 126 causing the shaft 127 to retract into the cylinder 126, which in turn may vary the position of the pulling member 24 relative to the anchor 22. Thereby, the cap 30 may be rotated relative to the hub 12, to loosen or loosen the cap 30 from or to the hub 12.

In other embodiments, and as illustrated in FIG. 3, the closure 10 may include one or more additional tightening pulling ear 35, and one or more additional loosening pulling ear 135. Such embodiments may also include protective ears 33 and 133 to discourage hammering on the pulling ears. In still other embodiments, the cap may include a plurality of pulling ears positioned substantially around the full circumference of the cap, wherein a pulling member may be selectively engaged with a selected pulling ear to tighten or loosen a cap. Such embodiments may be desirable where a cap may be interchanged on a number of different hubs, or for retro-fitting a cap according to this invention on a vessel including a prior art closure.

In some embodiments, the vessel end of the hub may be secured to the vessel wherein the hub may provide a through bore OD at least as large as the port OD. In such embodiments, the hub may be secured to the vessel substantially external to the port OD. Alternative embodiments of closures according to this invention may be constructed and/or utilized wherein at least a portion of the vessel end of a hub may positioned into or inserted within a port, and fixedly secured to the vessel. In such embodiment, the vessel end of the hub may include a male vessel attachment component.

It may be understood by those skilled in the art that an anchor may be provided fixedly secured to the cap and one or more pulling ears may be provided fixedly secured to the hub. Such embodiment may be configured similar to the disclosed preferred embodiments, but with the components altered slightly to accommodate the reverse, alternative configuration. In either a preferred or alternative embodiment, a pulling assembly may be provided between an anchor and pulling ears, engaged to each of the anchor and the pulling ear, and actuatable to rotate the cap relative to the hub.

Alternative embodiments of closures according to this invention may include variations of arrangements of cap engagement threads 16 and hub engagement threads 17. For example, one closure configuration may provide for cap initial engagement with the hub and rotation to sealing cap engagement with the hub, wherein the cap is rotated relative to the hub for less than five 360 degree rotations, depending at least partially upon closure pressure rating and size. In other embodiments, the cap may require less than one rotation for cap sealing engagement. Other embodiments may dispense with multiple revolution threads on the cap and hub, and instead provide a plurality of inter-locking lugs or "short-threads" on each of the cap and hub, for rotational engagement of a cap and hub. In such embodiments, cap rotation from initial engagement of the cap with the hub to full sealing engagement may be only a portion of a full revolution, such as less than one-quarter turn. Such embodiments may typically include two, three or four sets of short-thread type interlocking lugs. Still other embodiments may include additional short-threads interlocking lugs.

In the preferred embodiments discussed above, the cap may include substantially female or internal threads 17 and the hub may include substantially male, or external threads 16. However, in still other embodiments of closures according to this invention, the cap may include substantially male threads, and the hub may include substantially female threads. In such alternative embodiments, the cap may in essence be a plug, and the hub may in essence be a receptacle for the cap within a portion of the hub. In such embodiments, one components, either the cap or the hub, may include an anchor attached thereto, and the other component of the cap and hub, may include one or more pulling ears attached thereto. A pulling assembly may be engaged thereto and between each of the anchor and the ears.

Alternative embodiments of this invention may include one or more variations for engaging the pulling stop with the pulling bar. Alternative pulling stops may include pins engaged within a pin port provided within a pulling member end of the pulling bar. For example, a pulling stop may be a cotter key or pin. Washers may be provided between the pulling stop and the pulling member. Embodiments including pins or other variations of pulling stops may not require threads on the pulling bar 26, the shaft 127, or the stop 28. The pulling bar may also include an upset shoulder with which to engage the pulling member there-against.

In still other embodiments, the anchor may be secured to a portion of the vessel, rather than the hub. Additionally, various known hinge arrangements and/or cap handling supports may be provided to facilitate handling and manipulating the cap when disengaged from the hub.

It may be appreciated that various changes to the details of the illustrated embodiments and systems disclosed herein, may be made without departing from the spirit of the invention. While preferred and alternative embodiments of the present invention have been described and illustrated in detail, it is apparent that still further modifications and adaptations of the preferred and alternative embodiments may occur to those skilled in the art. However, it is to be expressly understood that such modifications and adaptations are within the spirit and scope of the present invention, which is set forth in the following claims.

What is claimed is:

1. A closure to sealingly enclose a port in a vessel, the port having a port axis, the closure comprising:
   a hub having a vessel end fixedly and sealingly secured to the vessel, a through bore having a through bore axis, a cap end opposite the vessel end, and a cap engagement thread;
   a cap including a hub engagement thread for threaded engagement with the cap engagement thread;
   an anchor fixedly secured to one of the hub and the cap;
   a tightening pulling ear and a loosening pulling ear each fixedly secured to another of hub and the cap, the tightening pulling ear for tightening the cap to the hub and the loosening pulling ear for loosening the cap from the hub, each of the tightening pulling ear and the loosening pulling ear having a pulling surface thereon;
   a pulling bar having an anchor end pivotally secured to the anchor and an opposing pulling member end;
   a pulling member having a pulling bar end selectively securable to the pulling member end of the pulling bar and an opposing end removably engagable with the pulling surface on the tightening pulling ear for tightening the cap to the hub, and with the pulling surface on the loosening pulling ear for loosening the cap from the hub; and
   a pulling stop simultaneously engagable with each of the pulling member end of the pulling bar and the pulling bar end of the pulling member for selectively moving the pulling member relative to the anchor and thereby rotate the cap relative to the hub.

2. The closure as defined in claim 1, wherein the pulling member end of the pulling bar includes external threads, and the pulling stop includes internal threads for threaded engagement with the external threads on the pulling bar.

3. The closure as defined in claim 2, wherein the pulling stop is rotated relative to the pulling bar to rotate the cap relative to the hub.

4. The closure as defined in claim 1, wherein the anchor is fixedly secured to the hub and each of the tightening pulling ear and the loosening pulling ear are fixedly secured to the cap.

5. The closure as defined in claim 1, wherein the pulling bar further comprises;
   a powered actuator to move the pulling member relative to the anchor to rotate the cap relative to the hub.

6. The closure as defined in claim 5, wherein the powered actuator is a pressure actuator fluid-cylinder responsive to fluid pressure and having a cylinder end and a rod end for varying the position of the pulling stop relative to the anchor to rotate the cap relative to the hub.

7. The closure as defined in claim 1, wherein the pulling ear includes a plurality of circumferentially spaced tightening pulling ears each fixedly secured to the cap for selective engagement with a pulling member.

8. The closure as defined in claim 1, wherein the pulling member includes an ear engagement surface for selective planar engagement with the pulling surface on the tightening pulling ear, and the pulling surface on the loosening ear.

9. The closure as defined in claim 1, further comprising:
   a pivot pin pivotally connecting the anchor end of the pulling bar with the anchor.

10. The closure as defined in claim 1, wherein the pulling bar end of the pulling member includes an aperture for receiving the pulling bar therein.

11. The closure as defined in claim 1, further comprising;
   a seal for sealing between the cap and the hub to sealingly isolate fluid internal to the vessel from fluid external to the vessel.

12. The closure as defined in claim 1, further comprising:
   a plurality of hammer lugs for rotating the cap relative to the hub.

13. The closure as defined in claim 1, wherein the through bore axis of the hub is substantially aligned with the port axis.

14. The closure as defined in claim 1, wherein the through bore in the hub includes a through bore OD at least as large as an OD of the port in the vessel.

15. A method of sealingly enclosing a port in a vessel, the port having a port axis, the method comprising:

fixedly securing a vessel end of a hub to a vessel, the hub having a through bore with a through bore axis, and a cap end opposing the vessel end;

threadably engaging a cap with the cap end of the hub;

fixedly securing an anchor to one of the hub;

fixedly securing each of a tightening pulling ear and a loosening pulling ear to the cap;

engaging both the anchor and one of the tightening pulling ear and the loosening pulling ear with a moveable pulling assembly including at least a pulling bar, a pulling member and a pulling stop;

selectively actuating the pulling assembly for selectively moving the tightening pulling ear relative to the anchor and thereby tightening the cap to the hub; and selectively actuating the pulling assembly for selectively moving the loosening pulling ear relative to the anchor and thereby loosening the cap from the hub.

16. The method of sealingly enclosing a port in a vessel as defined in claim 15, wherein selectively actuating the pulling assembly further comprises:

providing threads on each of the pulling bar and the pulling stop for threaded engagement of the pulling stop with the pulling bar;

selectively rotating the pulling stop relative to the pulling bar to tighten the cap to the hub; and selectively rotating the pulling stop relative to the pulling bar to loosen the cap from the hub.

17. The method of sealingly enclosing a port in a vessel as defined in claim 15, wherein selectively actuating the pulling assembly further comprises:

pressurizing a fluid-cylinder for varying the position of the pulling stop relative to the anchor to tighten the cap to the hub; and pressurizing a fluid-cylinder for varying the position of the pulling stop relative to the anchor to loosen the cap from the hub.

18. The method of sealingly enclosing a port in a vessel as defined in claim 15, further comprising:

sealing between the cap and the hub with a seal member to isolate media internal to the vessel from media external to the vessel.

* * * * *